United States Patent
Yoshida et al.

(10) Patent No.: US 8,659,851 B2
(45) Date of Patent: Feb. 25, 2014

(54) PERMANENT MAGNET MEMBER FOR VOICE COIL MOTOR AND VOICE COIL MOTOR

(75) Inventors: Kenichi Yoshida, Tokyo (JP); Shigeya Takahashi, Tokyo (JP); Kazuaki Nawa, Tokyo (JP)

(73) Assignee: TDK Corporation, Tokyo (JP)

( * ) Notice: Subject to any disclaimer, the term of this patent is extended or adjusted under 35 U.S.C. 154(b) by 248 days.

(21) Appl. No.: 13/334,634

(22) Filed: Dec. 22, 2011

(65) Prior Publication Data

US 2012/0161550 A1 Jun. 28, 2012

(30) Foreign Application Priority Data

Dec. 28, 2010 (JP) ................. P2010-293738

(51) Int. Cl.
*G11B 21/22* (2006.01)
(52) U.S. Cl.
USPC ........................................ 360/264.9
(58) Field of Classification Search
USPC ........................................ 360/264.9
See application file for complete search history.

(56) References Cited

U.S. PATENT DOCUMENTS

| | | | |
|---|---|---|---|
| 6,757,139 B2 * | 6/2004 | Miyamoto | 360/256.4 |
| 6,816,343 B1 * | 11/2004 | Oveyssi | 360/265 |
| 7,298,592 B2 * | 11/2007 | Lee et al. | 360/265 |
| 7,414,815 B2 * | 8/2008 | Fujimoto et al. | 360/264.7 |
| 7,684,156 B2 * | 3/2010 | Okutomi et al. | 360/256.2 |
| 7,729,090 B2 * | 6/2010 | Hashizume et al. | 360/256.4 |

FOREIGN PATENT DOCUMENTS

JP   A-2006-073142   3/2006

* cited by examiner

Primary Examiner — Mark Blouin
(74) Attorney, Agent, or Firm — Oliff PLC

(57) ABSTRACT

A magnetic head is controlled more stably when retracted from above a magnetic disk. When a permanent magnet member 10 having a protrusion projecting from the longer periphery to a side opposite to the center of a fan is mounted on a yoke 15, the end part P side where the sum of thicknesses (P1+P2) is the largest, i.e., the upper face side of a magnet matrix 111 on the protrusion side, is higher than the upper face side of the magnet matrix in the other area. Therefore, since the magnet matrix 111 in the protrusion is located closer to a lock pin 21, the magnetic attraction force between the lock pin 21 and the permanent magnet member 10 becomes stronger, so that the permanent magnet member 10 is locked more firmly when retracted from above the magnetic disk (at the time of locking), whereby the stability can be enhanced.

16 Claims, 6 Drawing Sheets

PERMANENT MAGNET MEMBER FOR VOICE COIL MOTOR AND VOICE COIL MOTOR

BACKGROUND OF THE INVENTION

1. Field of the Invention

The present invention relates to a permanent magnet member for a voice coil motor and a voice coil motor.

2. Related Background Art

Hard disk drives (HDD) widely used as data storage means for computers have a structure in which one or a plurality of magnetic disks are arranged on the same axis and driven by a spindle motor. Data are read from and written onto the HDD by magnetic heads disposed so as to oppose the magnetic disks. The magnetic heads are driven by an actuator, a typical example of which is a voice coil motor (VCM) of a swinging type.

The VCM functions to scan the magnetic head on the magnetic disk stably at a high speed by swinging. The magnetic head has conventionally been caused to float above the magnetic disk by an airflow occurring as the magnetic disk rotates. If the magnetic disk stops rotating for some reason, however, the magnetic head may collide with the magnetic disk, thereby damaging the information stored on the magnetic disk. Therefore, the VCM is provided with a latch mechanism which is a mechanism for rapidly retracting and securing the magnetic head from above the magnetic disk. For example, Japanese Patent Application Laid-Open No. 2006-073142 discloses a structure in which a protrusion is provided at a specific position of a permanent magnet member for swinging the magnetic head by the VCM, so that the magnetic head is retracted from above the magnetic disk by magnetic attraction to this protrusion.

SUMMARY OF THE INVENTION

Recently, as the recording density has been increasing in magnetic disks, it has been demanded for magnetic heads reading and writing data to operate with higher precisions. Therefore, the above-mentioned latch mechanism has also been required to perform control at a higher precision, stable control in the case of retracting the magnetic head from above the magnetic disk in particular.

In view of the foregoing, it is an object of the present invention to provide a permanent magnet member for a voice coil motor which can control a magnetic head more stably when the latter is retracted from above a magnetic disk, and a voice coil motor using the permanent magnet member for a voice coil motor.

For achieving the above-mentioned object, the permanent magnet member for a voice coil motor according to an aspect of the present invention is a permanent magnet member comprising a magnet matrix made of a rare-earth magnet having a substantially fan-shaped two-dimensional form including a shorter periphery, a longer periphery separated by a predetermined distance from the shorter periphery, and a pair of side peripheries each connecting the shorter and longer peripheries to each other, the magnet matrix having a protrusion projecting from the longer periphery to a side opposite to a center of the fan; and a coating covering a surface of the magnet matrix; wherein the sum of the thickness of the magnet matrix and the thickness of the coating on at least one of a pair of main faces of the magnet matrix is the largest in the protrusion.

In the above-mentioned permanent magnet member for a voice coil motor, the sum of the thickness of the magnet matrix and the thickness of the coating on at least one of a pair of main faces of the magnet matrix is the largest in the protrusion used for a latch mechanism, whereby the magnet matrix in the protrusion is positioned higher than a yoke when the permanent magnet member is mounted on the yoke. Therefore, when the magnetic head is retracted from the magnetic disk, the latch mechanism based on the magnetic attraction to the protrusion can function in a more stable state, whereby the magnetic head can be controlled more stably.

Preferably, the protrusion is disposed on one end side of the longer periphery, while the sum of the thickness of the magnet matrix and the thickness of the coating on at least one of the pair of main faces of the magnet matrix varies by 1 to 10 μm between an end part of the shorter periphery on the other end side different from the one end side of the longer periphery provided with the protrusion and the protrusion.

The structure mentioned above achieves stable control when retracting the magnetic head from the magnetic disk and improves the stability at the time of swinging the magnetic head above the magnetic disk.

The coating covering the one main face of the magnet matrix may have such a thickness as to become the smallest in an area surrounded by the peripheries and the largest in the protrusion, the largest and smallest values yielding a difference of 3 to 18 μm therebetween.

When the thickness of the coating on the magnet matrix is the smallest in the area surrounded by the peripheries as such, the permanent magnet member for a voice coil motor can be secured stably with respect to the yoke and inhibit the magnetic head from resonating according to the thickness of an adhesive used for securing.

The coating may be constituted by an electroplated film made of Ni or an Ni alloy.

The voice coil motor according to an aspect of the present invention comprises a coil attached to a rotatable member rotatable about a predetermined axis, a pair of yokes opposing each other with a predetermined distance therebetween so as to hold a rotatable area of the coil therebetween, and the above-mentioned permanent magnet member secured with respect to and between the pair of yokes so as to form a magnetic gap with the yokes.

The present invention provides a permanent magnet member for a voice coil motor which can control a magnetic head more stably when the latter is retracted from above a magnetic disk, and a voice coil motor using the permanent magnet member for a voice coil motor.

DESCRIPTION OF THE PREFERRED EMBODIMENTS

In the following, modes for carrying out the present invention will be explained in detail with reference to the accompanying drawings. In the explanations of the drawings, the same constituents will be referred to with the same signs while omitting their overlapping descriptions.

Voice Coil Motor

Figure 1:
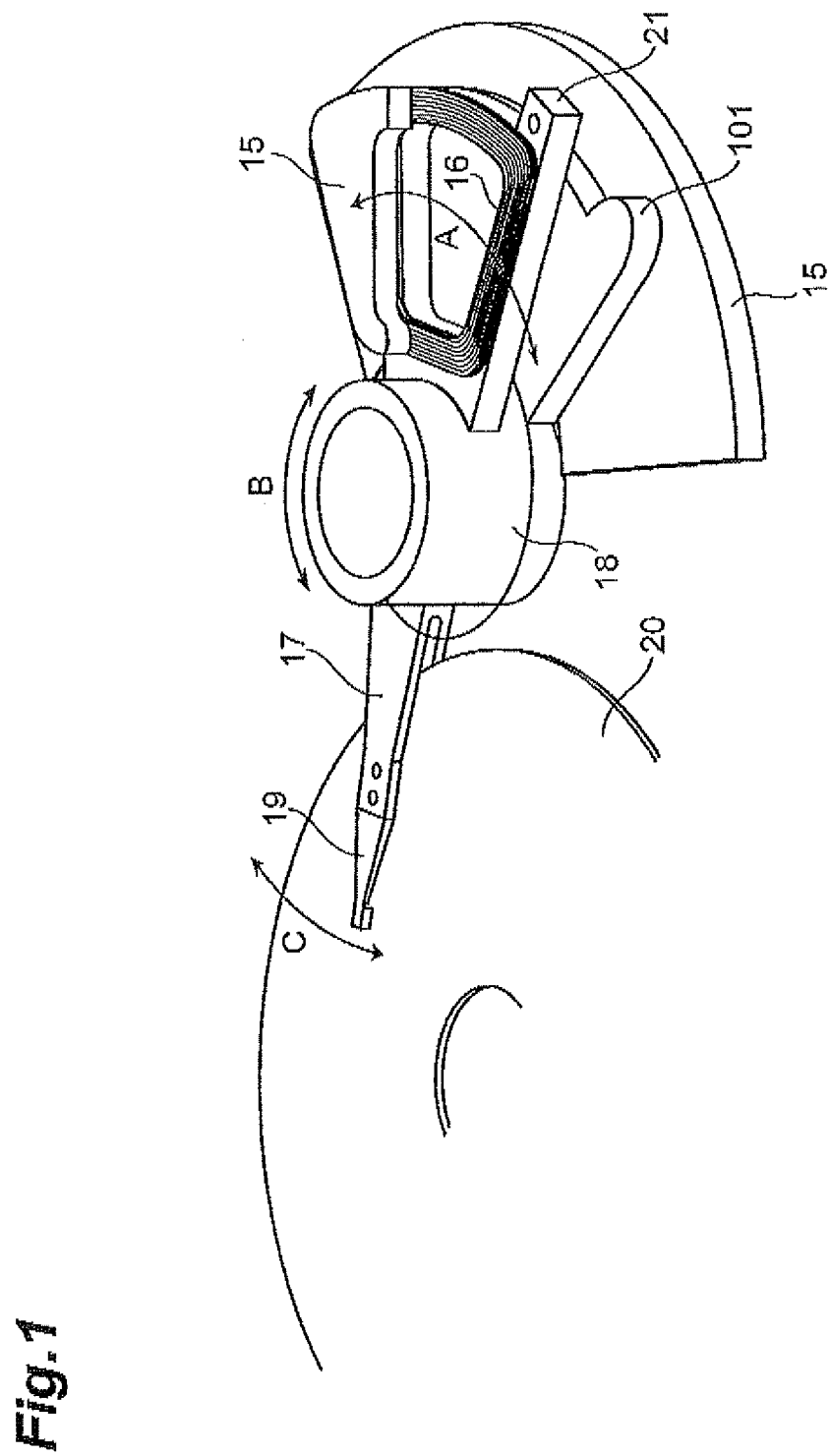
FIG. 1 is a schematic structural diagram of the VCM in accordance with an embodiment.
Figure 2:
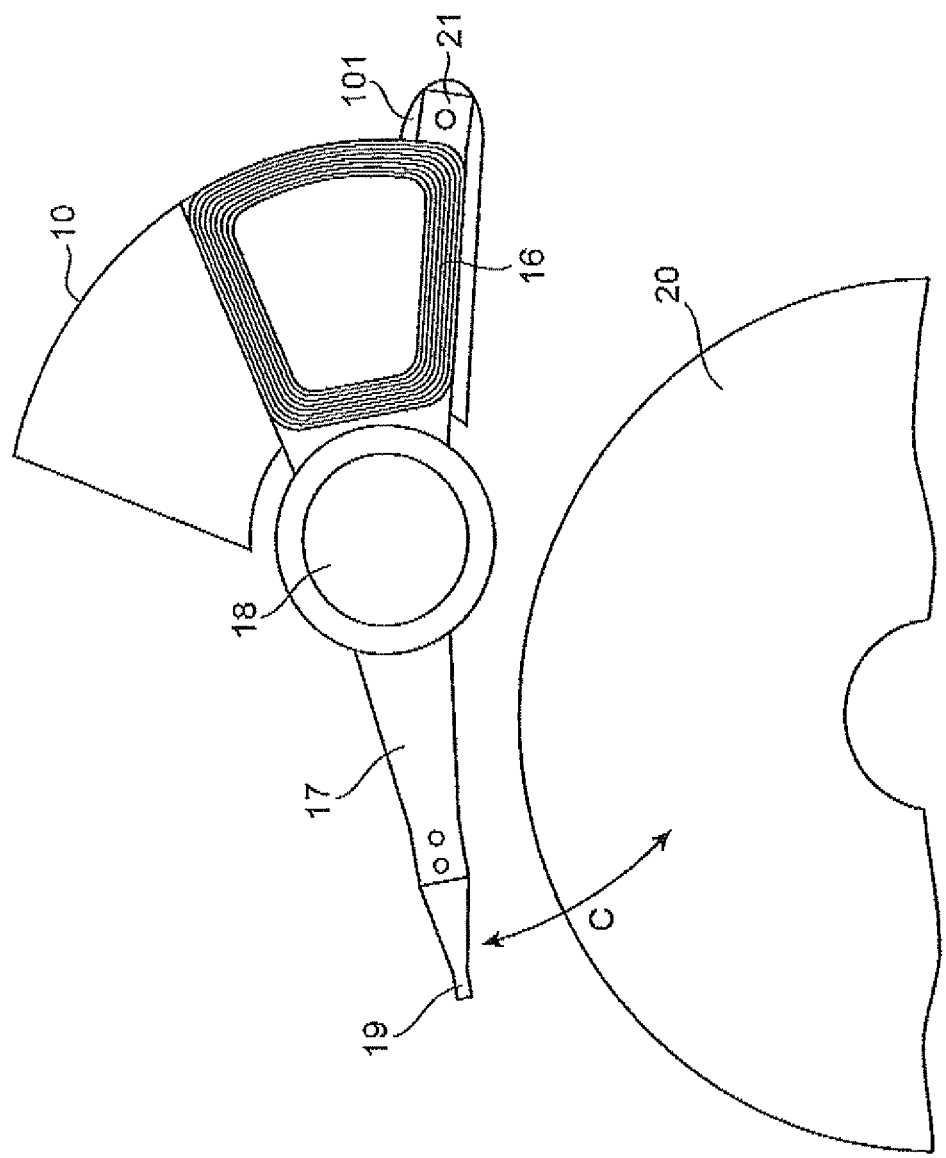
FIG. 2 is a schematic structural diagram of the VCM in accordance with the embodiment for explaining a structure in the case where a magnetic head is locked.

First, with reference to FIGS. 1 and 2, the voice coil motor (VCM) in accordance with an embodiment will be explained. FIG. 1 is a schematic structural diagram for explaining the structure of the VCM in accordance with this embodiment, while FIG. 2 is a diagram for explaining a structure in the case where a magnetic head is locked in the VCM of FIG. 1.

As illustrated in FIG. 1, the VCM 1 in accordance with this embodiment is constituted by a pair of yokes 15 opposing each other; a permanent magnet member 10, bonded and secured with an adhesive or the like to one of the yokes 15 between the yokes 15, for a VCM; a fan-shaped coil 16 rotatable about a bearing 18; and a head carriage 17 connected to the coil 16.

When the fan-shaped coil 16 is energized with a predetermined driving current, a driving force is generated in the coil 16 by Fleming's left-hand rule, so that the coil 16 rotates in the direction of arrow A about the bearing 18, thereby swinging the head carriage 17 in the direction of arrow B about the bearing 18. Using this action, a magnetic head 19 mounted to the leading end of the head carriage 17 is moved in the direction of arrow C opposite to the rotating direction of the coil 16, so as to be positioned with respect to a magnetic disk 20.

The VCM 1 in accordance with this embodiment has a lock pin 21 attached thereto on the outer periphery side of the fan-shaped coil 16. The permanent magnet member 10 is provided with a protrusion 101 projecting to the outer periphery side (the front side depicted in FIG. 1). When the magnetic head 19 does not perform any of reading and writing with respect to the magnetic disk 20, i.e., when the magnetic head 19 is not in operation, the magnetic head 19 is retracted from the magnetic disk 20 as illustrated in FIG. 2. Here, the lock pin 21 is attracted to the protrusion 101 of the permanent magnet member 10, so that the magnetic head 19 is locked on the outside of the magnetic disk 20. The yokes 15 are disposed with such a distance therebetween that the permanent magnet member 10 does not come into contact with a movable part including the coil 16 when the movable part rotates. Specifically, from the viewpoint of mobility, the distance between the movable part and the yokes 15 and between the movable part and the permanent magnet member 10 is preferably 10 μM to 1 mm.

The permanent magnet member 10 used in the VCM 1 will be explained later. Silicon steel sheets electrolessly plated with Ni are typically used as the yokes 15 in the VCM 1. In general, the yoke 15 and the permanent magnet member 10 are secured together with an adhesive. It is preferred for the yoke 15 and the permanent magnet member 10 to be secured firmly together.

Permanent Magnet Member for VCM

Figure 3:
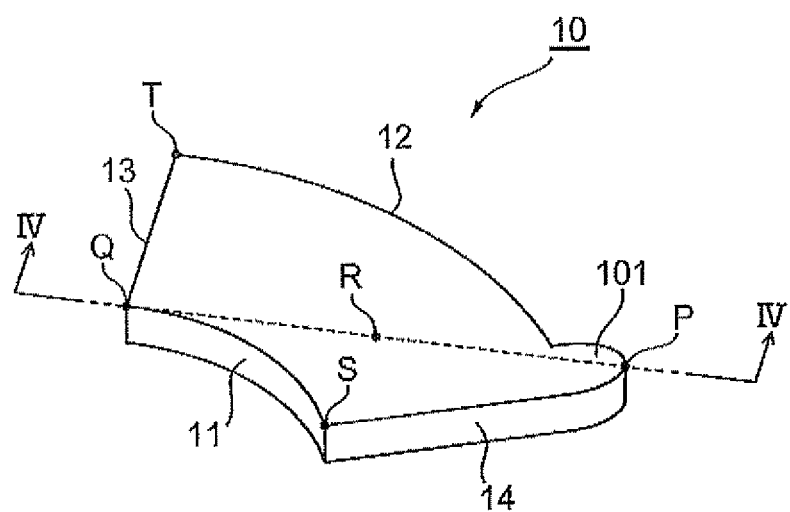
FIG. 3 is a perspective view of the permanent magnet member for a VCM in accordance with an embodiment.

The permanent magnet member 10 will now be explained in detail with reference to FIGS. 3 and 4. As illustrated in FIG. 3, the permanent magnet member 10 has a substantially fan-shaped two-dimensional form including a shorter periphery 11, a longer periphery 12 separated by a predetermined distance from the shorter periphery 11, and side peripheries 13, 14 each connecting the shorter and longer peripheries 11, 12 to each other. Here, a pair of surfaces each having a substantially fan-shaped two-dimensional form are those yielding the largest area in the permanent magnet member 10 and constitute main faces of the permanent magnet member 10. The permanent magnet member 10 is provided with a protrusion 101 projecting from one end part of the longer periphery 12 to the side opposite to the center of the fan. The protrusion 101 is substantially circular in FIG. 3, but may be substantially quadrangular, for example. That is, the form of the protrusion 101 is not restricted in particular.

Figure 4:
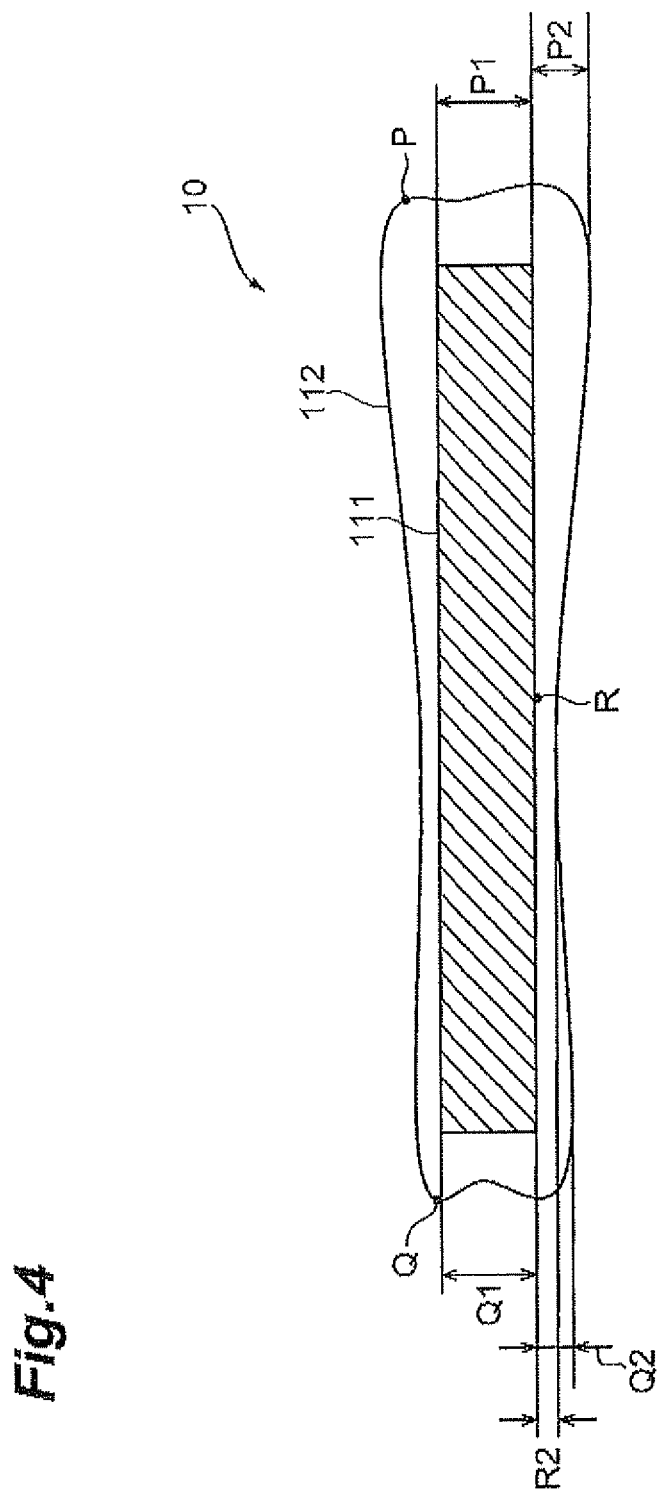
FIG. 4 is a view taken along the arrow IV-IV of FIG. 3.

FIG. 4 illustrates a view of the permanent magnet member 10 taken along the arrow IV-IV connecting an end part P of the protrusion 101 and an end part Q of the shorter periphery 11 diagonally opposite to the protrusion 101 in the permanent magnet member 10 (the intersection between the shorter periphery 11 and side periphery 13). On an extension of an end part of a magnet matrix, a midpoint between the end parts P, Q is defined as point R. As illustrated in FIG. 4, the permanent magnet member 10 comprises a magnetic matrix 111 and a coating 112 made of Ni or Ni alloy plating (hereinafter collectively referred to as Ni plating) as an anticorrosion film applied to surfaces of the magnet matrix 111. The end parts P, Q, which are illustrated on the coating 112 on the surfaces of the protrusion 101 in FIG. 4, are located on vertical extensions of end parts of the magnet matrix 111.

More specifically, a rare-earth magnet constituting the magnet matrix 111 is an R-T-B-based rare-earth magnet containing a rare-earth element R, a transition metal element T, and boron B. The rare-earth element R may be at least one kind selected from the group consisting of La, Ce, Pr, Nd, Pm, Sm, Eu, Gd, Tb, Dy, Ho, Er, Tm, Yb, and Lu. Preferably, the rare-earth magnet contains both of Nd and Pr as the rare-earth element R in particular. Preferably, the rare-earth magnet contains Co and Fe as the transition metal element T. By containing these elements, the rare-earth magnet remarkably improves its residual magnetic flux density and coercive force. When necessary, the rare-earth magnet may further contain other elements such as Mn, Nb, Zr, Ti, W, Mo, V, Ga, Zn, Si, and Bi. Preferably, the coating 112 is constituted by an electroplated film made of Ni or an Ni alloy. A method for manufacturing the permanent magnet member 10 will be explained later.

In the permanent magnet member 10 in accordance with this embodiment, the sum of the thickness of the magnet matrix 111 and the thickness of the coating 112 on at least one of the pair of main faces of the magnet matrix 111 is the largest in the protrusion 101. Specifically, in FIG. 4, the sum (P1+P2) of the thickness P1 of the magnet matrix on the end part P side of the protrusion 101 and the thickness P2 of the coating 112 on one main face side (the lower side in FIG. 4) at the end part P is greater than that in the other area and attains the largest value at the end part P.

Preferably, on the same main face side of the permanent magnet member 10, the difference between the sum (Q1+Q2) of the thickness Q1 of the magnet matrix on the end part Q side and the thickness Q2 of the coating 112 on one main face side (the lower side in FIG. 4) and the sum of thicknesses (P1+P2) at the end part P is 1 to 10 μm.

The effect obtained when the sum of thicknesses (P1+P2) is the largest on the end part P side as mentioned above will now be explained with reference to FIG. 5.

Figure 5:
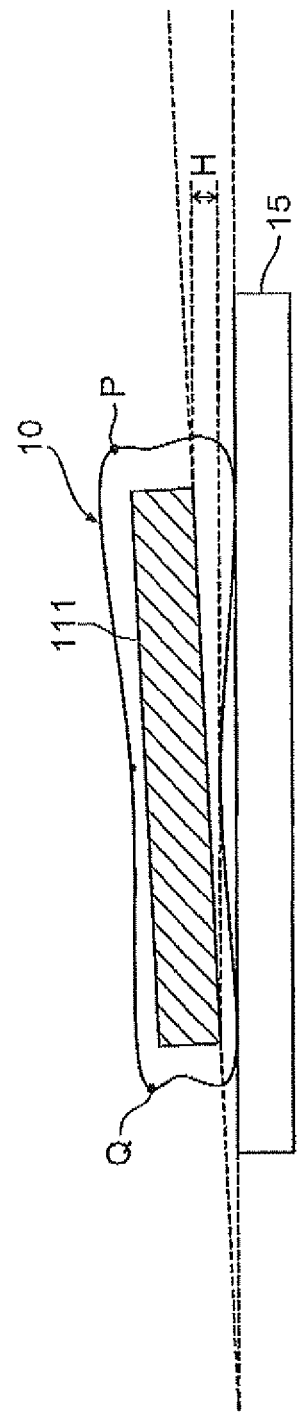
FIG. 5 is a view, corresponding to that taken along the arrow IV-IV of FIG. 3, for explaining the structure in the case where the permanent magnet member for a VCM in FIG. 3 is secured onto a yoke.

FIG. 5 is a view illustrating the structure in the case where the permanent magnet member 10 is mounted on the yoke 15 having a flat form. When the permanent magnet member 10 of this embodiment is mounted on the yoke 15, the end part P side where the sum of thicknesses (P1+P2) is the largest, i.e., the upper face side of the magnet matrix 111 on the protrusion 101 side, is higher than the upper face side of the magnet matrix 111 in the other area as illustrated in FIG. 5. Specifically, when the magnet matrix 111 has the same thickness on the P and Q sides, the height H in FIG. 5 corresponds to the difference in height therebetween. Therefore, since the magnet matrix 111 of the protrusion 101 is located closer to the lock pin 21, the magnetic attraction force between the lock pin 21 and the permanent magnet member 10 becomes stronger, so that the latter is locked more firmly when retracted from above the magnetic disk (at the time of locking), whereby the stability can be enhanced.

Tilting the magnet matrix 111 of the permanent magnet member 10 with respect to the yoke 15 as mentioned above, however, lowers the bilateral symmetry in rotating (swinging) the magnetic head 19 above the magnetic disk 20 by the magnet matrix 111. This is because the magnetic field fluctuates more depending on the position of the coil 16 when the magnet matrix 111 is arranged with an inclination to the yoke 15. Therefore, in order to inhibit the bilateral symmetry in swinging the magnetic head 19 from lowering and enhance the stability at the time of locking, the difference between the sum of thicknesses (Q1+Q2) at the end part Q and the sum of thicknesses (P1+P2) at the end part P is preferably 1 to 10 μm. In this range, the torque occurring upon latching (locking) becomes stronger only within a specific range, thereby making it possible to improve the stability at the time of locking and inhibit the bilateral symmetry in swinging from lowering.

Preferably, in the permanent magnet member 10 in accordance with this embodiment, the thickness of the coating 112 is the smallest in an area surrounded by the peripheries (11 to 14) and the largest in the protrusion 101. Specifically, the thickness R2 of the coating in a part on the inside of the magnet matrix 111, e.g., at the midpoint R illustrated in FIG. 4, is preferably smaller than the thickness of the coating in the other area. This improves the adhesion at the time of securing the permanent magnet member 10 to the yoke 15 with an adhesive as illustrated in FIG. 5. Preferably, the difference between the largest and smallest values is 3 to 18 μm. When the difference between the largest and smallest values in thickness of the coating 112 falls within the range mentioned above, the resonance can be restrained from being caused by the bonding to the yoke 15.

The permanent magnet member 10 in accordance with this embodiment can achieve the above-mentioned structure by changing the thickness of the coating 112 and thus can improve the stability of the latch mechanism more easily than by altering the form of the magnet matrix and incorporating other mechanisms, for example.

Method for Manufacturing the Permanent Magnet Member for a VCM

A method for manufacturing the permanent magnet member 10 will now be explained.

First, a method for manufacturing the magnet matrix 111 within the permanent magnet member 10 will be explained. The method for manufacturing a rare-earth magnet to become the magnet matrix 111 initially casts a material alloy, so as to yield an ingot. As the material alloy, one containing the rare-earth element R, Co, and B may be used. When necessary, the material alloy may further contain the transition metal element T (e.g., Fe) other than Co as well as elements such as Cu, Ni, Mn, Al, Nb, Zr, Ti, W, Mo, V, Ga, Zn, Si, and Bi. The chemical composition of the ingot may be adjusted according to that of the main phase of the rare-earth magnet to be obtained finally.

Next, the ingot is roughly pulverized by a disk mill or the like, so as to produce an alloy powder having a particle size of about 10 to 100 μm. This alloy powder is finely pulverized by a jet mill or the like, so as to yield an alloy powder having a particle size of about 0.5 to 5 μm, which is then molded under pressure in a magnetic field. Preferably, the magnetic field applied to the alloy powder at the time of molding under pressure has a strength of 800 kA/m or higher. Preferably, the pressure applied to the alloy powder at the time of molding is about 10 to 500 MPa. Any of uniaxial pressing and isostatic pressing such as CIP may be used as the molding method. Thereafter, the resulting molded body is fired, so as to produce a sintered body (magnet matrix). The firing is preferably performed in a vacuum or an inert gas atmosphere of Ar or the like at a firing temperature of about 1000 to 1200° C. The firing time may be about 0.1 to 100 hr. The firing step may be performed a plurality of times.

Preferably, the sintered body obtained by the firing is subjected to aging. In the aging, the sintered body is preferably heat-treated for about 0.1 to 100 hr in an inert gas atmosphere at a temperature of about 450 to 950° C. Such aging further improves the coercive force of the rare-earth magnet. The aging may be constituted by multistage heat treatment steps. In an example of the aging constituted by two stages of heat treatment, the first stage of heat treatment heats the sintered body for 0.1 to 50 hr at a temperature of at least 700° C. but lower than the firing temperature, and the second stage of heat treatment heats the sintered body for 0.1 to 100 hr at a temperature of at least 450 to 700° C.

The sintered body obtained by the above-mentioned method may be processed into a predetermined form when necessary. Examples of the processing method include form processing such as cutting and shaving and chamfering such as barrel polishing. Such processing is not always necessary.

Thus obtained magnet matrix may be washed as appropriate in order to remove irregularities on the surface or impurities and the like attached to the surface. A preferred example of washing methods is acid washing (etching) with an acid solution. The acid washing makes it easier to dissolve the irregularities and impurities away from the surface of the magnet matrix, so as to yield the magnet matrix with a smooth surface.

Preferably, after washing the acid-washed magnet matrix with water so as to remove therefrom the processing liquid used for acid washing, the magnet matrix is washed ultrasonically in order to completely eliminate small amounts of undissolved matters and residual acid components remaining on the surface of the magnet matrix. The ultrasonic washing can be performed in purified water hardly containing chlorine ions which produce rust on the surface of the magnet matrix or in an alkaline solution, for example. If necessary, the magnet matrix may be washed with water after the ultrasonic washing. Any typical degreasing solutions used for steels can be employed for degreasing without any restrictions in particular. In general, they are mainly composed of NaOH with other additives, if any, which are not specified.

Preferred as an acid used for acid washing is nitric acid, which is an oxidizing acid with low hydrogen production. When plating typical steel materials, non-oxidizing acids such as hydrochloric acid and sulfuric acid are often used. The nitric acid concentration in the processing liquid is preferably 1 N or less, 0.5 N or less in particular.

When such an acid is used for processing the magnet matrix containing a rare-earth element, hydrogen produced by the acid is occluded into the surface of the magnet matrix, so that the site of occlusion becomes brittle, thereby generating a large amount of powdery undissolved matters. Since the powdery undissolved matters cause roughness, defects, and inferior adhesion on the processed surface, it is preferred for chemical etchants to be free of the above-mentioned non-oxidizing acids.

The amount of the surface of the magnet matrix dissolved by such acid washing, in terms of average thickness from the surface, is preferably at least 5 μm, more preferably 10 to 15

μm. This can substantially completely remove the altered and oxidized layers formed by surface processing of the magnet matrix.

Preferably, the preprocessed magnet matrix is washed ultrasonically in order to completely remove the small amounts of undissolved matters and residual acid components from its surface. Preferably, the ultrasonic washing is performed in ion-exchanged water hardly containing chlorine ions which produce rust on the surface of the magnet matrix. Similar water washing may be carried out when necessary before/after the ultrasonic washing and in each of the steps of the preprocessing.

The foregoing processing yields the magnet matrix 111. Next, a coating is formed on the surface of the magnet matrix 111 by electroplating.

The plating step forms a first layer containing at least one metal selected from the group consisting of Al, Sc, Ti, V, Cr, Mn, Fe, Co, Ni, Cu, and Zn or an alloy containing this metal onto the surface of the magnet matrix obtained. Sputtering or vapor deposition may also be used. When constituted by a plated metal, the layer can be formed by typical electroplating or electroless plating. Specifically, electrolytic Ni plating, electroless Ni plating, or electrolytic Cu plating can form a coating constituted by its corresponding plated film. More specifically, the coating can be formed by preparing a plating bath, dipping the magnet matrix into a plating solution by using a barrel tank or hook, and energizing the magnet matrix.

Examples of the plating bath used for electric plating with Ni include Watts baths containing no Ni chloride, sulfamate baths, borofluoride baths, and Ni bromide baths.

An electroless Ni plating layer can be formed, for example, by dipping the magnet matrix 10 into a nickel chemical plating solution (at a temperature of about 80° C.) containing a reducing agent such as sodium hypophosphite, a complexing agent such as sodium citrate, ammonium sulfate, and the like.

Employable as an electrolytic copper plating solution is one containing copper sulfate at a concentration of 20 to 150 g/L and a chelating agent such as ethylenediaminetetraacetic acid (EDTA) at a concentration of 30 to 250 g/L. The current density in the electrolytic copper plating may be 0.1 to 1.5 A/dm$^2$, while the temperature of the electrolytic copper plating bath may be 10 to 70° C.

The permanent magnet member 10 in accordance with this embodiment regulates the thickness of the coating 112 by controlling the plating method. When forming an Ni plating film by electroplating, for example, the current density tends to become higher in peripheral parts of the permanent magnet member at which electric fields concentrate from various directions, and lower in a flat part surrounded by the peripheral parts where only electric fields perpendicular thereto are applied. Therefore, this relationship in current density can be used for making the coating thicker in the protrusion 101 than in the other area.

Rack plating performs plating by letting a cathode terminal directly hold an object to be plated and making the latter oppose an anode. The plating current density distribution on the object to be plated, i.e., the coating thickness distribution, can be controlled by the distance between the object to be plated and the anode, their positional relationship, and appropriate arrangements of shields and sacrificial cathodes.

Barrel plating mixes an object to be plated and an electrically conductive medium within a barrel, inserts a cathode terminal therein, and performs plating such that the plating barrel opposes the anode. Combinations of the form/quantity of the object to be plated and the form/quantity of the conductive medium allow the conductive medium to serve as a sacrificial cathode, so as to control the plating current density distribution on the object to be plated, i.e., the plated coating thickness distribution.

While the permanent magnet member and voice coil motor in accordance with the present invention have been explained in the foregoing, various modifications can be made in the permanent magnet member and voice coil motor in accordance with the present invention.

For example, the position of the protrusion in the permanent magnet member is on one end side of the outer periphery in the above-mentioned embodiment, but is not limited thereto. The form of the protrusion is not restricted in particular.

While the above-mentioned embodiment explains a structure in which the coating on the outside of the magnet matrix has the same thickness on both sides of a pair of main faces thereof, it will be sufficient if the coating satisfies the above-mentioned condition on one side of a pair of main faces.

EXAMPLES

The present invention will now be explained more specifically with reference to examples and comparative examples, but will not be limited to the following examples at all.

Example 1

Method of Manufacturing a Magnet

An ingot having a composition of 27.4Nd-3Dy-1B-68.6Fe mass % made by powder metallurgy was pulverized by a stamp mill and a ball mill, so as to yield a fine alloy powder having the above-mentioned composition. Thus obtained fine alloy powder was press-molded in a magnetic field, so as to form a molded body. The resulting molded body was sintered while being held at a temperature of 1100° C. for 1 hr and then aged for 2 hr in an Ar gas at 600° C., so as to yield a sintered body. The sintered body was processed into a substantially fan-shaped sheet having a flat area of 250 mm$^2$ and a thickness of 1 mm with a circular protrusion (the form illustrated in FIG. 3: type 1), which was then chamfered by barrel polishing, so as to obtain a magnet matrix.

Preprocessing

Subsequently, the magnet matrix was subjected to preprocessing which performs alkali degreasing, water washing, acid washing with a nitric acid solution, water washing, smut removal by ultrasonic washing, and water washing.

Coating

Next, a plating bath (liquid type: S1) constituted by 270 g/L of nickel sulfate hexahydrate, 50 g/L of nickel chloride hexahydrate, 45 g/L of boric acid, 5 g/L of sodium saccharin, and 0.3 g/L of coumarin was prepared. The pH and temperature of this plating bath were 4.5 and 50° C., respectively.

The preprocessed magnet matrix was dipped into the above-mentioned plating bath, so as to perform electroplating. The electroplating was carried out by rack plating at a current density of 0.2 A/dm$^2$ until a plating film having a thickness of 3.0 μm was formed in a region R on the surface of the magnet matrix in FIG. 3, so as to yield the permanent magnet member in accordance with Example 1.

Examples 2 to 6 and Comparative Examples 1 to 3

The permanent magnet members in accordance with Examples 2 to 6 and Comparative Examples 1 to 3 were manufactured while changing any of the form of the protrusion of the magnet matrix (type 1: circular; type 2: rectangular), liquid type of the plating bath (S1, S2, W1, W2), pH, temperature, and plating technique (a rack method in which the protrusion of the magnet matrix was adjusted so as to approach the anode or a barrel method in which the amount of medium was regulated such that the plating on the protrusion of the magnet matrix became thicker).

The respective compositions of the liquid types (S2, W1, W2) of the plating bath were as follows:
S2: 150 g/L of nickel sulfate hexahydrate, 100 g/L of nickel chloride hexahydrate, 45 g/L of boric acid, 5 g/L of sodium saccharin, and 0.1 g/L of 1.4-butyne-2-diol
W1: 300 g/L of nickel sulfamate tetrahydrate, 30 g/L of nickel chloride hexahydrate, and 30 g/L of boric acid
W2: 200 g/L of nickel sulfamate tetrahydrate, 50 g/L of nickel chloride hexahydrate, and 30 g/L of boric acid

TABLE 1

| | | | Plating method | | | |
|---|---|---|---|---|---|---|
| | Magnet type | Material | Liquid | A/dm² | pH | Temp. (°C.) | Technique |
| Example1 | 1 | Ni | S1 | 0.2 | 4.5 | 50 | rack |
| Example2 | 1 | Ni | S1 | 0.2 | 4.5 | 50 | rack |
| Example3 | 1 | Ni | S2 | 0.1 | 4.5 | 50 | barrel |
| Example4 | 2 | Ni | S2 | 0.1 | 4.5 | 50 | barrel |
| Example5 | 1 | Ni | S1 | 0.2 | 4.0 | 50 | barrel |
| Example6 | 1 | Ni | S1 | 0.2 | 4.0 | 50 | barrel |
| Comparative Example1 | 1 | Ni | W1 | 0.2 | 4.0 | 50 | rack |
| Comparative Example2 | 1 | Ni | W2 | 0.2 | 4.0 | 50 | barrel |
| Comparative Example3 | 1 | Ni | W1 | 0.2 | 4.5 | 50 | rack |

Evaluation of Permanent Magnet Member
Evaluation of the Thickness of the Magnet Matrix and the Thickness of the Coating The thickness of each of the above-mentioned permanent magnet members in accordance with Examples 1 to 6 and Comparative Examples 1 to 3 and the thickness of its corresponding plating film were measured by a micrometer and a fluorescent X-ray coating thickness gauge, respectively. Measured points were four corners of the permanent magnet member and its center position, which were specifically points P, Q, R, S, and T illustrated in FIG. 3. Assuming that the magnet matrix had a uniform thickness, P Q/2 was calculated, so as to yield the difference in the sum of the thickness of the magnet matrix and the thickness of the film on one main face side in a pair of main faces of the magnet matrix between the points P and Q.

Assembly of VCM
Using the permanent magnet members obtained by the foregoing, VCM samples were made by the following method.

First, using an anaerobic acrylic adhesive (Loctite 638UV manufactured by Loctite Japan Co., Ltd.), each of the magnet members obtained as mentioned above was attached to a yoke made of SPCC having a thickness of 1 mm.

Subsequently, together with an actuator equipped with a coil and a lock pin, a VCM illustrated in FIG. 1 was assembled. This VCM was designed such as to have an actuator movable range of 14° to 58°, swing range of 28° to 57° (a swing center angle at 42.5°), and a latching point at 17°.

Evaluation of Latching
After making the above-mentioned VCM, the angle dependence of actuator latch torque (unit: mN·m, i.e., millinewton·meter) near the latching point (14° to 25°) was measured without energizing the coil.

Figure 6:
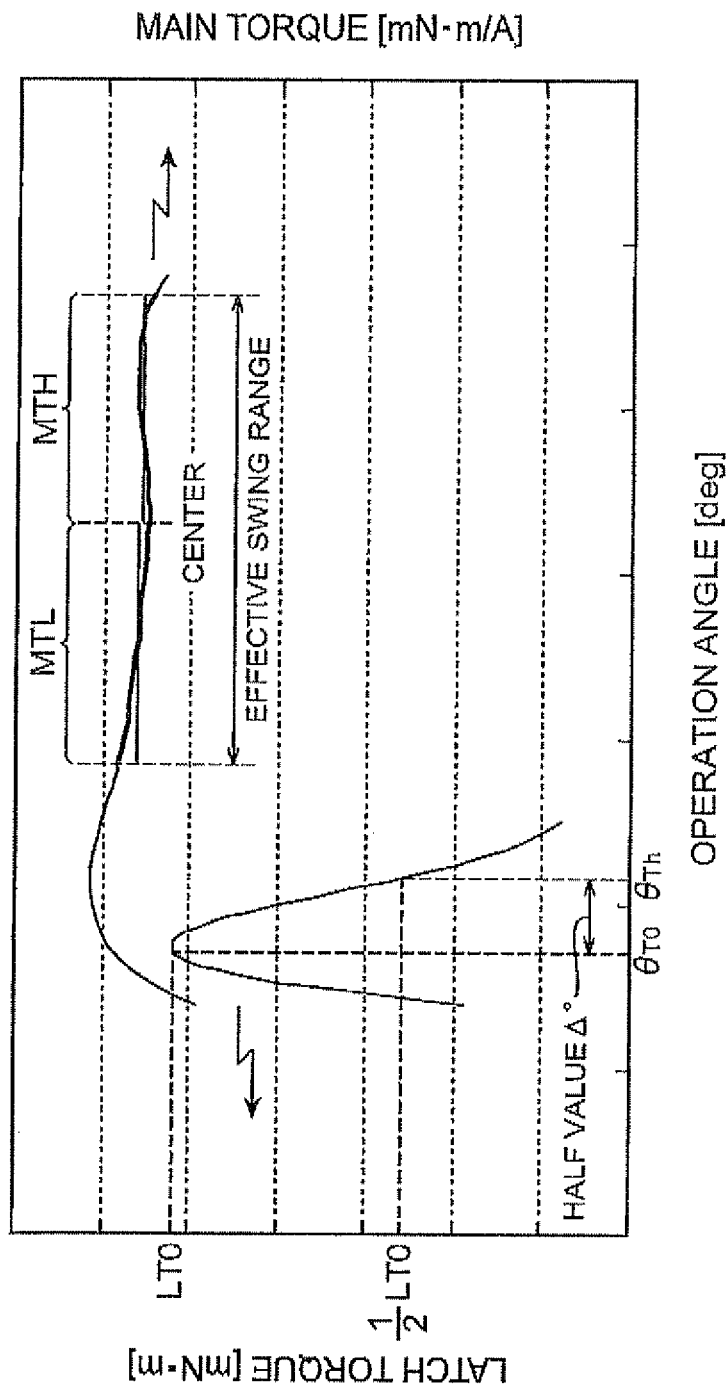
FIG. 6 is a chart for explaining evaluation methods.

Subsequently, a higher-side angle θTh indicating a half value of the latch torque LT0 at a latching point θT0 was determined, and Δ=θT0−θTh was defined as latchability (see FIG. 6). With respect to thus obtained latchability, the cases where Δ was less than 3°, 3° to 5', and more than 5° were denoted as A, B, and C, respectively.

Evaluation of Main Torque Symmetry
While the coil was energized, the angle dependence of actuator main torque (unit: mN·m/A, i.e., millinewton·meter/ampere) within the actuator movable range was measured.

Subsequently, a main torque average value MTL on the lower-angle side (28° to 42.5°) of the swing range and a main torque average value MTH on the higher-angle side (42.5° to 57°) thereof were determined, and the degree of deviation of their quotient from 100%, i.e., the absolute value of [MTH/MTL−1], was calculated and defined as swinging symmetry (see FIG. 6; MTH and MTL were calculated by using respective actuator main torques within the ranges indicated by "MTH" and "MTL" in FIG. 6).

The cases where thus obtained swinging symmetry was less than 3%, 3% to 5%, and more than 5% were denoted as A, B, and C, respectively.

Evaluation of Resonance
While energizing the coil with an AC so as to vibrate the actuator in a reciprocating manner, the amount of deflection of the yoke caused by the resonance at that time was detected by a laser Doppler displacement meter, from which a resonance frequency was specified by a fast Fourier transform (FFT) analyzer, and its resonance magnification [dB] was measured.

The cases where thus obtained resonance magnification was less than −30 dB, −30 to −20 dB, and more than −20 dB were denoted as A, B, and C, respectively.

Total Evaluation
After evaluating the three items as in the foregoing, those exhibiting A for all the items were considered more preferable and given the total evaluation of A. Those exhibiting A or B for all the three items were considered preferable and given the total evaluation of B. Those exhibiting C for one of the three items were given the total evaluation of C. Those exhibiting C for at least two of the three items were given the total evaluation of D. Table 3 lists the foregoing results.

TABLE 2

| | Magnet member thickness | | | | | Coating thickness | | | |
|---|---|---|---|---|---|---|---|---|---|
| | P-Q/2 (μm) | P (mm) | T (mm) | Q (mm) | S (mm) | P-Q (μm) | P end (μm) | Q end (μm) | R (μm) |
| Example1 | 1 | 1.002 | 1.000 | 1.000 | 1.000 | 1.0 | 6.0 | 5.0 | 3.0 |
| Example2 | 2 | 1.005 | 1.000 | 1.001 | 1.000 | 2.0 | 8.5 | 6.5 | 4.0 |
| Example3 | 4 | 1.010 | 1.001 | 1.002 | 1.001 | 4.0 | 11.8 | 7.8 | 4.8 |
| Example4 | 4 | 1.009 | 1.000 | 1.001 | 1.000 | 4.0 | 11.0 | 7.0 | 4.5 |
| Example5 | 6 | 1.015 | 1.002 | 1.003 | 1.002 | 6.0 | 18.0 | 12.0 | 7.0 |

TABLE 2-continued

| | Magnet member thickness | | | | | Coating thickness | | | |
|---|---|---|---|---|---|---|---|---|---|
| | P-Q/2 (μm) | P (mm) | T (mm) | Q (mm) | S (mm) | P-Q (μm) | P end (μm) | Q end (μm) | R (μm) |
| Example6 | 10 | 1.025 | 1.003 | 1.005 | 1.002 | 10.0 | 28.0 | 18.0 | 10.0 |
| Comparative Example1 | 0 | 1.000 | 1.000 | 1.000 | 1.000 | 0.0 | 45.0 | 45.0 | 15.0 |
| Comparative Example2 | 20 | 1.035 | 1.008 | 1.015 | 1.005 | 20.0 | 55.0 | 35.0 | 15.0 |
| Comparative Example3 | 0 | 1.000 | 1.000 | 1.000 | 1.000 | 0.0 | 7.0 | 7.0 | 4.0 |

TABLE 3

| | Latching | Symmetry | Resonance | Total |
|---|---|---|---|---|
| Example1 | B | A | A | B |
| Example2 | A | A | A | A |
| Example3 | A | A | A | A |
| Example4 | A | A | A | A |
| Example5 | A | B | A | B |
| Example6 | A | B | B | B |
| Comparative Example1 | C | A | C | D |
| Comparative Example2 | A | C | C | D |
| Comparative Example3 | C | A | A | C |

REFERENCE SIGNS LIST

1 ... voice coil motor; 10 ... permanent magnet member for a VCM; 101 ... protrusion; 111 ... magnet matrix; 112 ... coating

What is claimed is:

1. A permanent magnet member for a voice coil motor, the permanent magnet member comprising:
    a magnet matrix made of a rare-earth magnet having a substantially fan-shaped two-dimensional form including a shorter periphery, a longer periphery separated by a predetermined distance from the shorter periphery, and a pair of side peripheries each connecting the shorter and longer peripheries to each other, the magnet matrix having a protrusion projecting from the longer periphery to a side opposite to a center of the fan; and
    a coating covering a surface of the magnet matrix;
    wherein the sum of the thickness of the magnet matrix and the thickness of the coating on at least one of a pair of main faces of the magnet matrix is the largest in the protrusion.

2. The permanent magnet member according to claim 1, wherein the protrusion is disposed on one end side of the longer periphery; and
    wherein the sum of the thickness of the magnet matrix and the thickness of the coating on at least one of the pair of main faces of the magnet matrix varies by 1 to 10 μm between an end part of the shorter periphery on the other end side different from the one end side of the longer periphery provided with the protrusion and the protrusion.

3. The permanent magnet member according to claim 1, wherein the coating covering the one main face of the magnet matrix has such a thickness as to become the smallest in an area surrounded by the peripheries and the largest in the protrusion, the largest and smallest values yielding a difference of 3 to 18 μm therebetween.

4. The permanent magnet member according to claim 2, wherein the coating covering the one main face of the magnet matrix has such a thickness as to become the smallest in an area surrounded by the peripheries and the largest in the protrusion, the largest and smallest values yielding a difference of 3 to 18 μm therebetween.

5. The permanent magnet member according to claim 1, wherein the coating is constituted by an electroplated film made of Ni or an Ni alloy.

6. The permanent magnet member according to claim 2, wherein the coating is constituted by an electroplated film made of Ni or an Ni alloy.

7. The permanent magnet member according to claim 3, wherein the coating is constituted by an electroplated film made of Ni or an Ni alloy.

8. The permanent magnet member according to claim 4, wherein the coating is constituted by an electroplated film made of Ni or an Ni alloy.

9. A voice coil motor comprising:
    a coil attached to a rotatable member rotatable about a predetermined axis;
    a pair of yokes opposing each other with a predetermined distance therebetween so as to hold a rotatable area of the coil therebetween; and
    the permanent magnet member according to claim 1 secured with respect to and between the pair of yokes so as to form a magnetic gap with the yokes.

10. A voice coil motor comprising:
    a coil attached to a rotatable member rotatable about a predetermined axis;
    a pair of yokes opposing each other with a predetermined distance therebetween so as to hold a rotatable area of the coil therebetween; and
    the permanent magnet member according to claim 2 secured with respect to and between the pair of yokes so as to form a magnetic gap with the yokes.

11. A voice coil motor comprising:
    a coil attached to a rotatable member rotatable about a predetermined axis;
    a pair of yokes opposing each other with a predetermined distance therebetween so as to hold a rotatable area of the coil therebetween; and
    the permanent magnet member according to claim 3 secured with respect to and between the pair of yokes so as to form a magnetic gap with the yokes.

12. A voice coil motor comprising:
    a coil attached to a rotatable member rotatable about a predetermined axis;

a pair of yokes opposing each other with a predetermined distance therebetween so as to hold a rotatable area of the coil therebetween; and the permanent magnet member according to claim 4 secured with respect to and between the pair of yokes so as to form a magnetic gap with the yokes.

13. A voice coil motor comprising:

a coil attached to a rotatable member rotatable about a predetermined axis;

a pair of yokes opposing each other with a predetermined distance therebetween so as to hold a rotatable area of the coil therebetween; and the permanent magnet member according to claim 5 secured with respect to and between the pair of yokes so as to form a magnetic gap with the yokes.

14. A voice coil motor comprising:

a coil attached to a rotatable member rotatable about a predetermined axis;

a pair of yokes opposing each other with a predetermined distance therebetween so as to hold a rotatable area of the coil therebetween; and the permanent magnet member according to claim 6 secured with respect to and between the pair of yokes so as to form a magnetic gap with the yokes.

15. A voice coil motor comprising:

a coil attached to a rotatable member rotatable about a predetermined axis;

a pair of yokes opposing each other with a predetermined distance therebetween so as to hold a rotatable area of the coil therebetween; and the permanent magnet member according to claim 7 secured with respect to and between the pair of yokes so as to form a magnetic gap with the yokes.

16. A voice coil motor comprising:

a coil attached to a rotatable member rotatable about a predetermined axis;

a pair of yokes opposing each other with a predetermined distance therebetween so as to hold a rotatable area of the coil therebetween; and the permanent magnet member according to claim 8 secured with respect to and between the pair of yokes so as to form a magnetic gap with the yokes.

\* \* \* \* \*